(12) United States Patent
Swanson et al.

(10) Patent No.: US 9,477,564 B2
(45) Date of Patent: Oct. 25, 2016

(54) METHOD AND APPARATUS FOR DYNAMIC NODE HEALING IN A MULTI-NODE ENVIRONMENT

(71) Applicant: INTEL CORPORATION, Santa Clara, CA (US)

(72) Inventors: Robert C. Swanson, Olympia, WA (US); Robert W. Cone, Portland, OR (US); Malay Trivedi, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 14/310,835

(22) Filed: Jun. 20, 2014

(65) Prior Publication Data

US 2015/0370661 A1   Dec. 24, 2015

(51) Int. Cl.
  *G06F 11/20* (2006.01)
  *G06F 13/42* (2006.01)
  *G06F 13/40* (2006.01)

(52) U.S. Cl.
  CPC ....... *G06F 11/2033* (2013.01); *G06F 13/4027* (2013.01); *G06F 13/4221* (2013.01); *G06F 2201/85* (2013.01)

(58) Field of Classification Search
  CPC .. G06F 11/079; G06F 11/16; G06F 11/2007; G06F 11/3006; G06F 11/3055; G06F 11/3058; G06F 11/1629; G06F 11/1641; G06F 11/1658; G06F 11/2051; H04L 43/10; H04L 45/02
  See application file for complete search history.

(56) References Cited

U.S. PATENT DOCUMENTS

| | | | |
|---|---|---|---|
| 6,327,675 B1* | 12/2001 | Burdett | G06F 11/2051 714/11 |
| 7,660,314 B2* | 2/2010 | Wybenga | H04L 45/02 370/395.21 |
| 8,776,050 B2* | 7/2014 | Plouffe | G06F 9/45537 718/1 |
| 2004/0059805 A1* | 3/2004 | Dinker | G06F 11/2069 709/223 |
| 2005/0172164 A1* | 8/2005 | Fox | G06F 11/2023 714/13 |
| 2008/0162988 A1* | 7/2008 | Zorek | G06F 11/2025 714/13 |
| 2015/0006950 A1* | 1/2015 | Gurram | G06F 11/2007 714/4.12 |
| 2015/0032232 A1* | 1/2015 | Soldi | G05B 19/048 700/79 |

* cited by examiner

*Primary Examiner* — Nadeem Iqbal
(74) *Attorney, Agent, or Firm* — Law Office of R. Alan Burnett, P.S

(57) ABSTRACT

Method and apparatus for dynamic Node healing in a Multi-Node environment. A multi-node platform controller hub (MN-PCH) is configured to support multiple nodes through use of dedicated interfaces and components and shared capabilities. Interfaces and components may be configured to be used by respective nodes, or may be configured to support enhanced resiliency as redundant primary and spare interfaces and components. In response to detecting a failing or failing primary interface or component, the MN-PCH automatically performs failover operations to replace the primary with the spare. Moreover, the failover operation is transparent to the operating systems running on the platform's nodes.

25 Claims, 9 Drawing Sheets

METHOD AND APPARATUS FOR DYNAMIC NODE HEALING IN A MULTI-NODE ENVIRONMENT

BACKGROUND INFORMATION

The evolution of datacenters and the drive towards exascale high-performance computing is creating a long term platform trend towards increased node density. Multiple CPU (Central Processing Unit) nodes will need to be housed in a common board, card or even package substrate. In order to achieve platform cost, density and power efficiency, more of the platform capabilities need to be absorbed into fewer components. Present day computing architecture requires a dedicated Platform Controller Hub (PCH) per CPU node, necessitating multiple instances of the PCH on a shared board having multiple CPUs or CPU complexes.

Scaling existing platform architectures to dense form factors forces unnecessary duplication of large numbers of functions in each compute node and creates new problems that are unique to dense form factor platforms. The high density value proposition of future system solutions gets compromised by the requirement of a dedicated PCH per node. Elimination of the PCH through monolithic integration of the PCH functionality into CPU die is not power/area efficient, and does not provides a scalable solution either. Thus, there is a need for an improved platform architecture that will reduce or eliminate redundancy on the platform and meet the requirements of dense platform.

One approach to increasing form factor density is to employ multi-node aware platform controller hubs (MN-PCH). Under this scheme, a single MN-PCH is configured to replace the functionality provided by multiple PCHs under conventional multi-node shared board architectures. Longer term data indicates value of mission critical based computing moving from the traditional 8 socket glueless or 4 socket servers to a 2 socket higher RAS (reliability, availability, and serviceability) system. This does not diminish the 5-9's reliability standards, but requires that the newer system architectures must not be subject to a failure of the chipset interconnect. To accomplish this higher reliability system, the system architectures need to ensure that chipset components when coupled with the MN-PCH support this usage.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
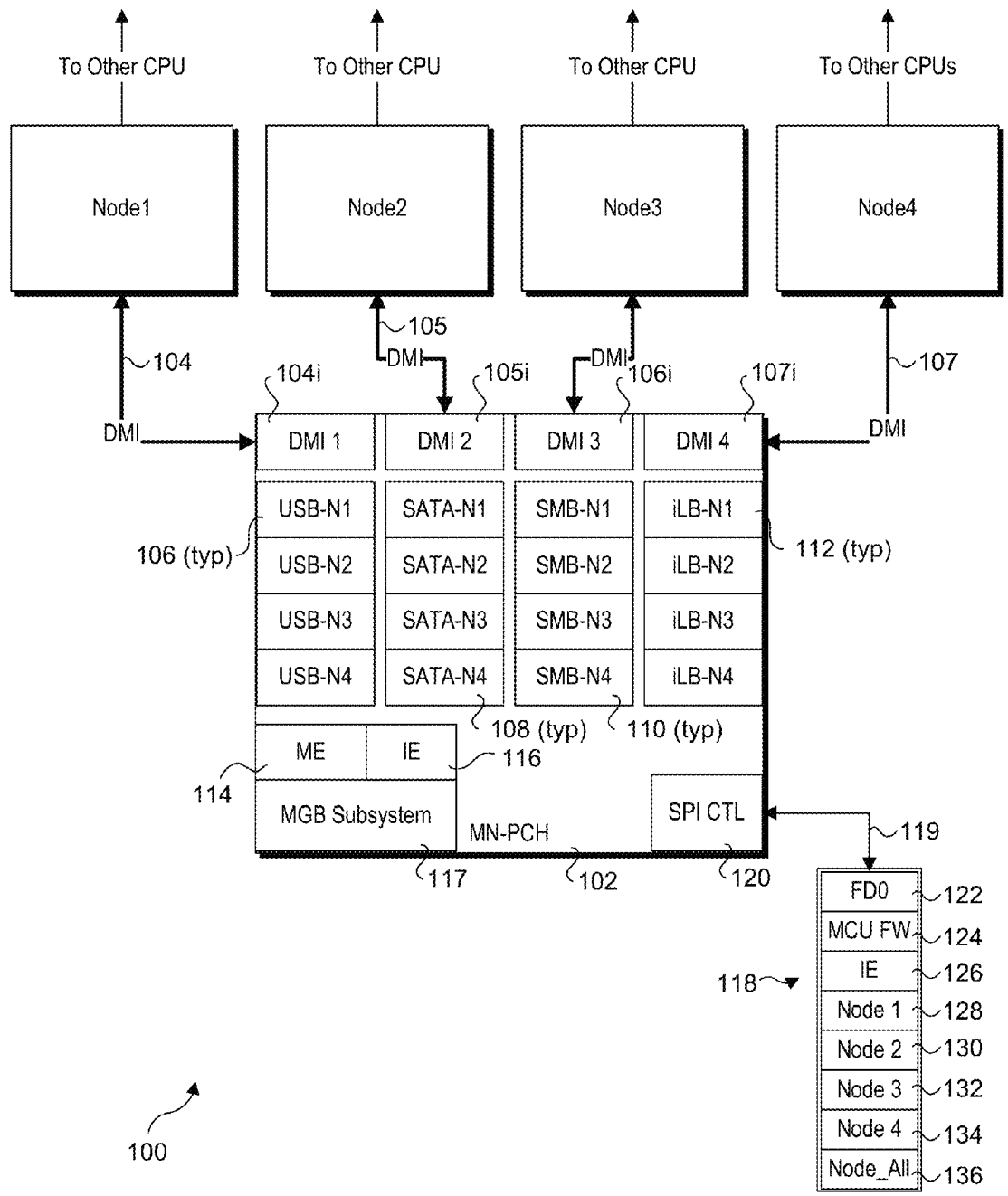
FIG. 1 is a schematic diagram of an exemplary multi-node platform architecture including an MN-PCH configured to support four nodes without redundancy.

Embodiments of methods and apparatus for dynamic node healing in a multi-node environment are described herein. In the following description, numerous specific details are set forth to provide a thorough understanding of embodiments disclosed and illustrated herein. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

FIG. 1 show a platform architecture 100 including a MN-PCH 102 configured to support four nodes (Node1, Node2, Node3 and Node4), according to one embodiment. In addition to supporting the four nodes shown, architecture 100 generally may be extended to support N nodes, such as but not limited to 6 nodes, 8 nodes, etc. In one embodiment, MN-PCH 102 supports DMI (direct media interface) links for in-band communication with each CPU complex that it attaches to, as depicted by DMI links 104, 105, 106, and 107, and respective DMI interfaces 104i, 105i, 106i and 107i. In addition, MN-PCH 102 supports a dedicated set of signals for out-of-band communication per-node, while aggregating the signaling to the rest of the platform.

Generally, MN-PCH 102 is configured to support functionality similar to that provided by a dedicated PCH to each of multiple nodes, but using a single integrated PCH rather than separate dedicated PCHs. This includes facilities for implementing various types of I/O interconnects and links for each of Node1, Node2, Node3, and Node4, such as USB (Universal Serial Bus) controllers 106, Serial Advanced Technology Attachment (SATA) controllers 108, Serial Management Bus (SMB) controllers 110 and sets of legacy facilities (iLB) 112.

MN-PCH 102 further includes a manageability engine (ME) 114, an innovation engine (IE) 116, and a manageability (MGB) subsystem 117. In one embodiment ME 114 is implemented as a converged security and manageability engine (CSME). In some embodiments, original equipment manufacturers (OEMs) may want to deploy customized functionality to augment the facilities provided by ME 114. These may be implemented by IE 116, which is also referred to as an OEM innovation engine. Generally, the use of IE 116 is optional. MGB subsystem interoperates with ME 114 and IE 116 (if used) to perform platform manageability operations.

Under a conventional platform architecture employing dedicated PCHs for each CPU, firmware storage devices and other peripheral devices may be accessed using applicable controllers, such as via a Serial Peripheral Interface (SPI) bus controller or an Enhanced SPI (eSPI) controller. Under one embodiment, similar controllers and interfaces to those provided by conventional PCHs are used, except the controllers and/or interfaces are shared between the nodes. For example, in one embodiment, the firmware including the BIOS boot images for all the nodes are contained in a single flash device that may either be local to the MN-PCH, as depicted by a flash storage device 118 coupled via an interconnect 119 to an SPI controller 120, or remotely attached (e.g., behind a baseboard management controller (BMC) (not shown)). The SPI flash device may either support independent BIOS regions for each node, or a common base BIOS for all nodes, plus additional BIOS regions per node for personality. MN-PCH 102 supports either dedicated boot drive per node, or a common shared boot drive. Under one embodiment, MN-PCH 102 also supports dynamic hard-partitioning.

As illustrated, the address space of flash storage device 118 is partitioned into multiple regions, including a flash descriptor 0 (FD0) region 122 in which chipset soft straps are located, and regions for storing manageability control unit firmware (MCU FW) 124, IE firmware 126, Node1 firmware 128, Node2 firmware 130, Node3 firmware 132, Node4 firmware 134, and common node firmware 136. The use of a single SPI controller and flash storage device interconnect eliminates the need for separate SPI controllers and/or flash storage devices for each node.

MN-PCH 102 provides a dedicated set of legacy facilities (iLB), such as Interrupt Controllers, Timers, GPIOs and SMBus on a per-node basis. MN-PCH 102 supports isolated error handling and recovery, such that errors detected along the datapath of one node do not impact any of the other nodes unless it is an irrecoverable global reset situation.

MN-PCH 102 supports a common manageability engine for all the nodes, with dedicated in-band and out-of-band manageability communication channels per node. The MN-PCH also provides a place-to-stand for OEM FW (Original Equipment Manufacturer Firmware) (e.g., Innovation Engine) for multi-node manageability.

Figure 2:
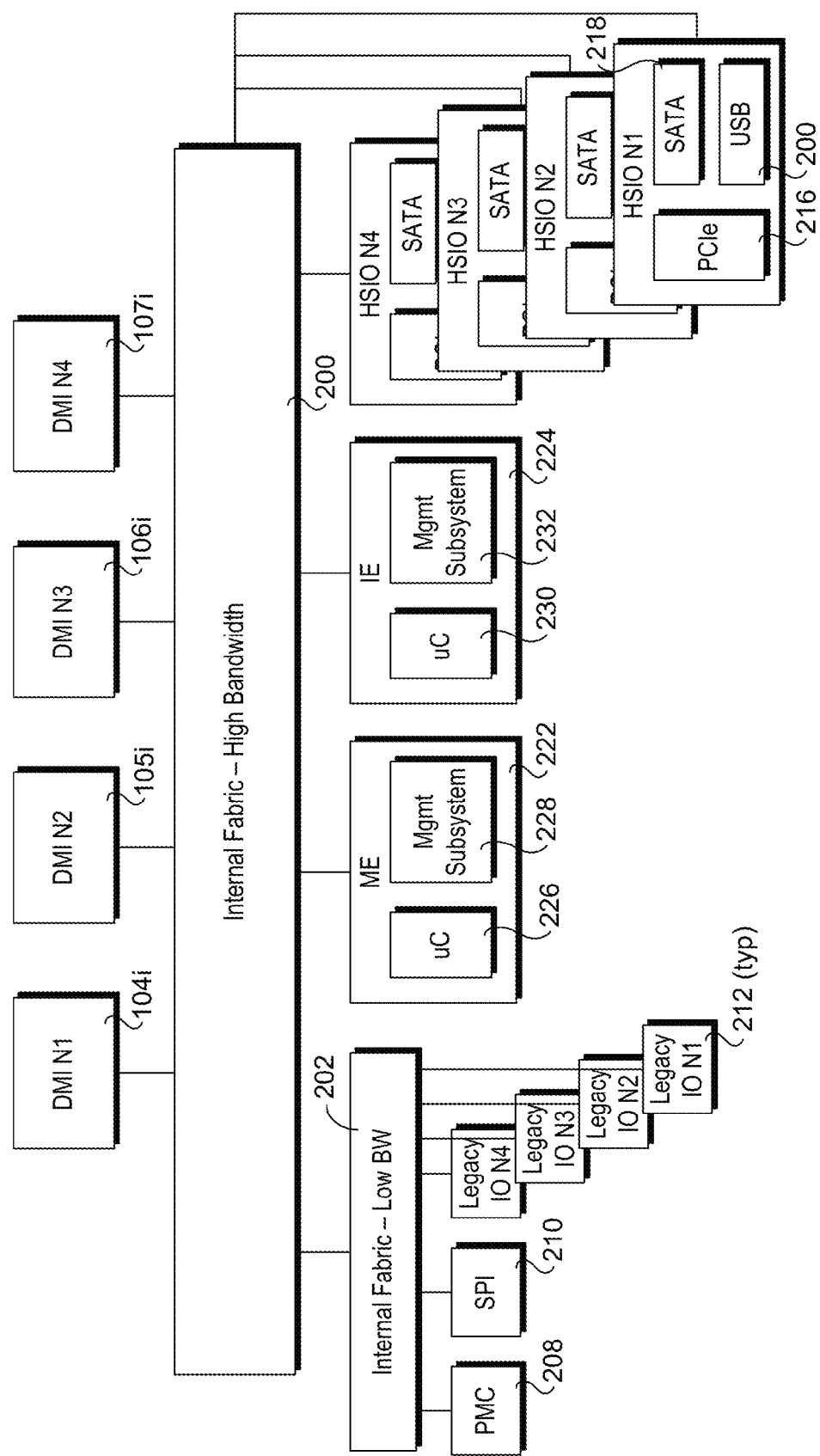
FIG. 2 is a schematic diagram illustrating an internal structure of the MN-PCH of FIG. 1, according to one embodiment.

An internal architecture diagram illustrating further details of MN-PCH 102, according to one embodiment, is shown in FIG. 2. The capabilities supported by MN-PCH 102 are interconnected by an internal backbone fabric including a high-bandwidth root fabric 200 and a low-bandwidth sub-fabric 202. The internal backbone fabric is configured to handle multiple orthogonal addressing spaces, which is effectively utilized by MN-PCH 102 to achieve further aggregation of capabilities at the component level. Moreover, the multi-root space aware internal backbone fabric keeps these orthogonal addressing spaces isolated and guarantees that a common switching fabric can be shared by multiple coherent systems.

The multi-node PCH architecture supports a multitude of DMI links for dedicated uplink connections to independent nodes. For the exemplary four-node case, this includes four DMI interfaces 104$i$, 105$i$, 106$i$, and 107$i$ coupled to a high-bandwidth root fabric 200, which provide a respective DMI interface for each of Node1, Node2, Node3, and Node4.

In one embodiment, the boot and legacy capabilities (reset/sequencing, boot, interrupts, timers, GPIOs, etc.) are provided by components coupled to sub-fabric 202. In the illustrated embodiment these components include a Power Management Controller (PMC) 208 and an SPI controller 210 that are shared across nodes, and a respective set of legacy IO facilities 212 for each of Node1, Node2, Node3, and Node4. The reset and boot blocks support multiple PCI headers for communicating with the individual root space in each node. PMC 208 enhances the single-node sequencing logic to be able to independently handle the reset sequencing of each node. Likewise, SPI controller 210 provides a path to the boot image, supports a dedicated header per node, and regulates access to isolated regions within the boot device. Several legacy capabilities supported by legacy IO blocks 212 utilize fixed Memory or IO addresses, and are replicated multiple times to cover all the nodes supported by MN-PCH 102.

In one embodiment, MN-PCH 102 supports dedicated platform level signals per node for per-node power delivery control. As a result, individual nodes can execute state transitions and host partition resets without impacting other nodes. The reset sequencing flows for the individual nodes are mutually independent, and can be interleaved by PMC 208.

Respective sets of high-speed IO (HSIO) controllers 214 for each of Node1, Node2, Node3, and Node4 are attached to high-bandwidth root fabric 200. In the illustrated embodiment, each HSIO controller 214 includes a PCIe controller 216, a SATA controller 218, and a USB controller 220. In addition to the HSIO controllers shown, other types of high-speed controllers and/or interfaces may also be provided, such as an extensible host controller interface (XHCI). Moreover, an HSIO controller may include one or more instances of an associated interface (e.g., multiple PCIe, SATA, and/or USB interfaces).

The High-Speed IO capability (e.g., provided by PCIe controller 216, SATA controller 218, and USB controller 220) of MN-PCH 102 is highly configurable amongst a set of generic physical lanes. The lanes can be flexibly mapped to various integrated IO controllers (not shown). In addition, each controller can be configured to any node during the initial boot sequence. This allows the customer to partition the IO capabilities amongst the nodes supported in the system. In one illustrative configuration, the IO lanes can be partitioned to provide an equal number of lanes of various IO protocols to each node. In another configuration, one node could be configured for minimal boot support while another one is configured for capacity storage by allocating all SATA controllers to a single node. Systems that have fewer nodes may even repurpose the unused uplinks to support downstream devices. Moreover, the number of lanes used for primary HSIO controllers may be different than the number of lanes used for spare HSIO controllers, as described and illustrated below. This ability to flexibly utilize the available number of lanes as per the system needs greatly expands the possibilities for customer-specific configurations.

MN-PCH 102 also supports additional micro-controller based sub-systems to provide platform, rack and/or facility level management capabilities. These include an ME 222 and an IE 224. ME 222 includes a micro-controller 226 and a management subsystem 228. Similarly, IE 224 includes a micro-controller 230 and a management subsystem 232. In one embodiment, these ME and IE management sub-systems have a host interface, but also may operate independent of the host.

The manageability engines (ME/CSME/IE) likewise support dedicated interfaces for each node, while providing access to manageability sensors and IO's on a per-node basis. The firmware running on microcontrollers 226 and 230 (e.g., MCU firmware 124 and IE firmware 126) is multi-node aware and allows a single instance of the ME and/or IE to service all the nodes in the system. The ME/IE can communicate with either a single multi-node aware BMC or to a dedicated BMC per node as per customer requirements.

In some embodiments, a multi-node PCH may be reconfigured to support redundant capabilities to increase reliability. For example, such a multi-node PCH may employ the redundant capabilities to support dynamic node healing under which the MN-PCH can be dynamically reconfigured such that a failed or failing primary interface or component is replaced with a corresponding spare interface or component.

Figure 1A:
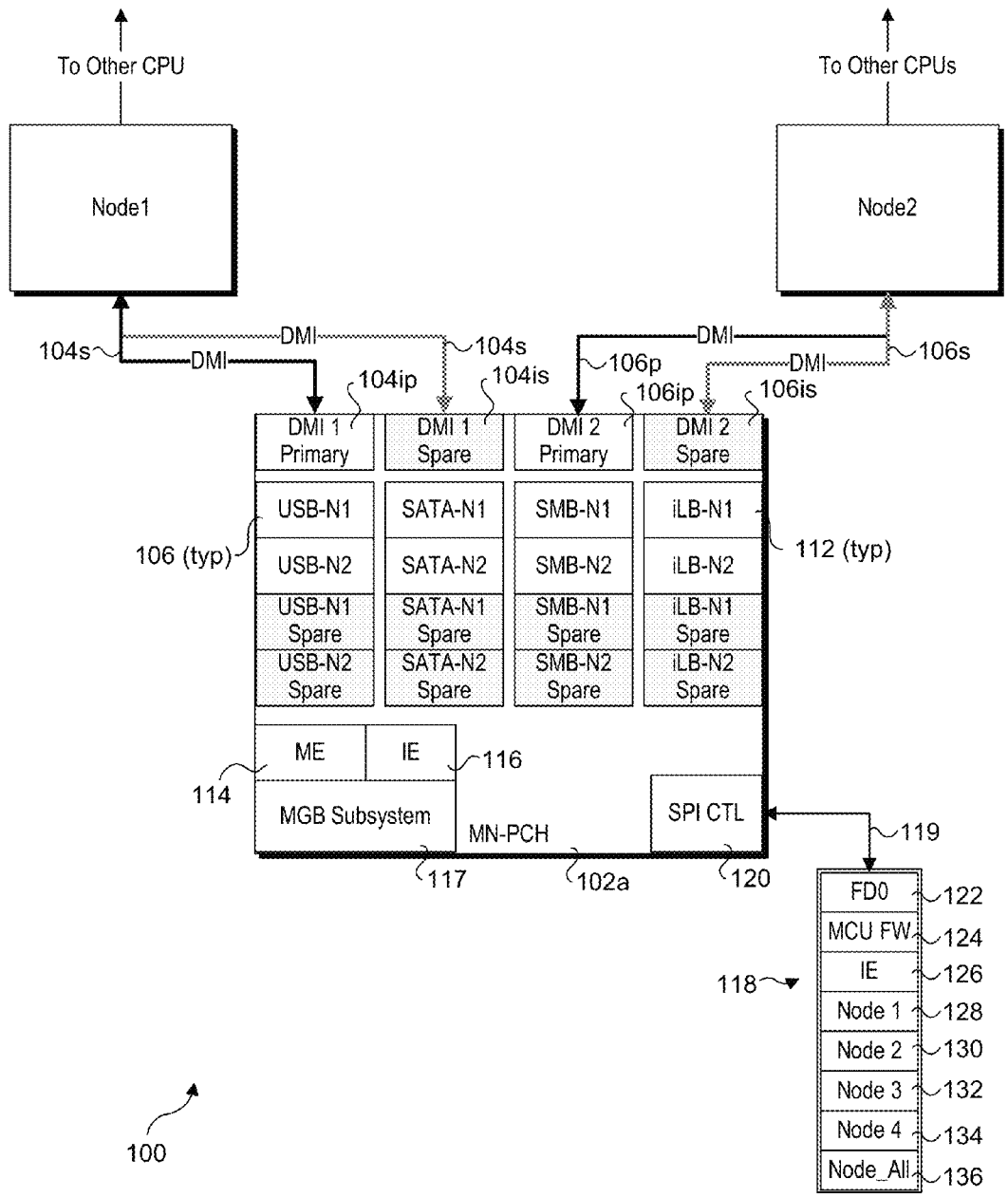
FIG. 1a is a schematic diagram of an exemplary multi-node platform architecture including the MN-PCH of FIG. 1 being reconfigured to support two nodes using redundant primary and spare interfaces and components.

FIG. 1a show a platform architecture 100a including a MN-PCH 102aconfigured to support dynamic node healing for two nodes (Node1 and Node2), according to one embodiment. In addition to supporting the two nodes shown, architecture 100 may be extended to support M nodes. In some embodiments, an MN-PCH may be configured to support N nodes without redundancies, or N/2 (or less) nodes with redundancies. For example, in one embodiment, MN-PCH 102 and MN-PCH 102a include the same components, interconnects, and logic, while MN-PCH 102 is configured to support four nodes and MN-PCH 102a is configured to support two nodes under which the (now) unused components and interconnects for the removed nodes (Node3 and Node 4) are used as spares configured to replace primary components and interconnects via associated failover operations.

Figure 2A:
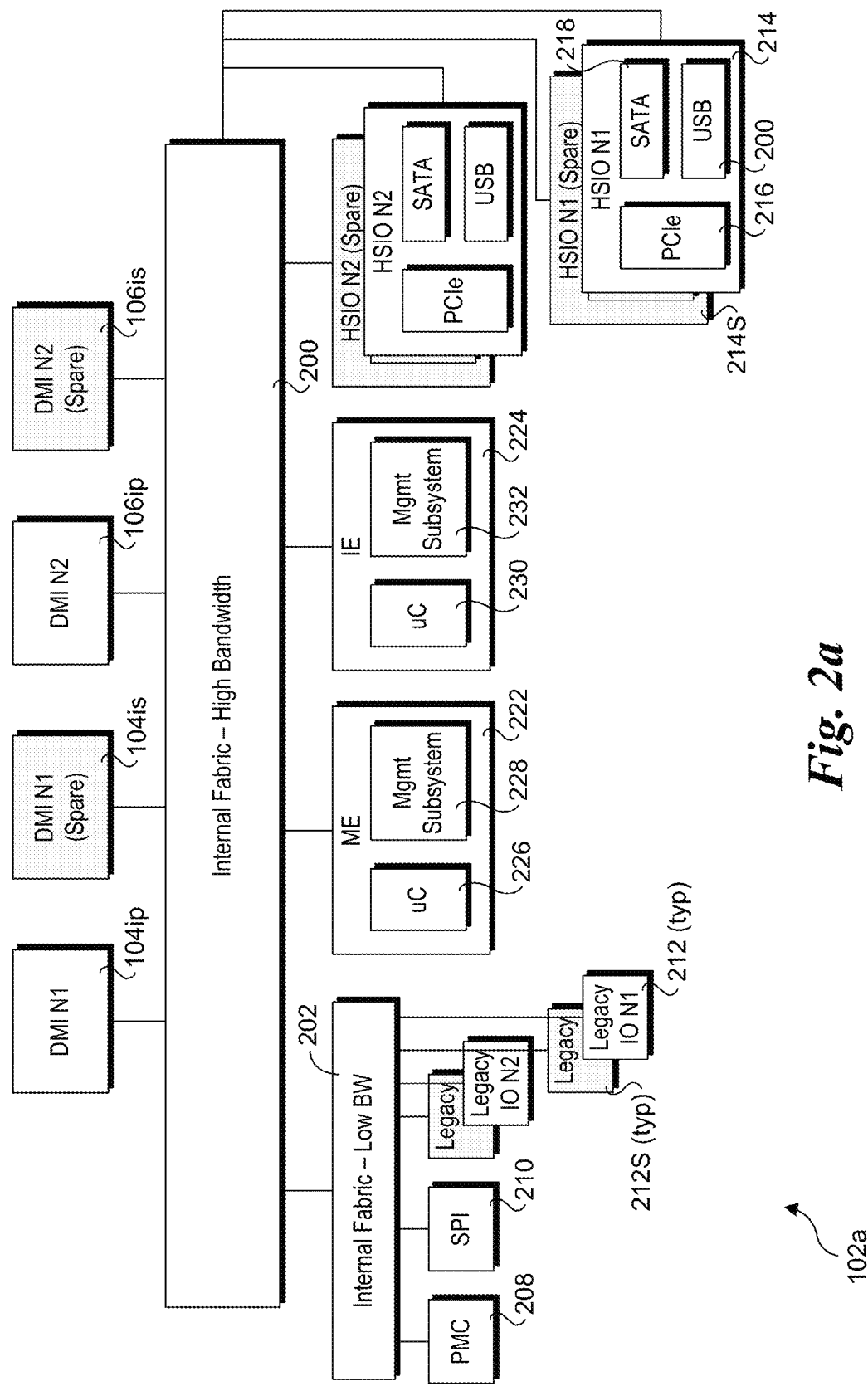
FIG. 2a is a schematic diagram illustrating an internal structure of the MN-PCH of FIG. 2 after being reconfigured to support redundant primary and spare interfaces and components.

As illustrated in FIGS. 1a and 2a, DMI links 104, 105, 106, and 107 in MN-PCH 102 are reconfigured in MN-PCH 102a to provide a primary DMI link and interface and a spare DMI link and interface for each of Node1 and Node2. After reconfiguration, these links and interfaces are depicted as primary DMI links 104p and 106p, primary DMI interfaces 104ip and 106ip, spare DMI links 104s and 106s, and spare DMI interfaces 104ip and 106ip. For illustrative purposes, spare interfaces and components are depicted in light gray to differentiate them from primary components. As further shown in FIG. 1a, USB controllers 106, SATA controllers 108, and SMB controllers 110 for Node1, Node2, Node3, and Node4 in MN-PCH 102 are reconfigured in MN-PCH 102a to provide a primary and spare controller for each of Node1 and Node2, as depicted by the further inclusion of spare USB controllers 106s, spare SATA controllers 108s, and spare SMB controllers 110s. In addition, a primary and spare set of legacy capabilities are provided for each of Node1 and Node2, as depicted in FIG. 1a as spare iLB interfaces 112s and further detailed in FIG. 2a. In a similar manner, HSIO controllers 214 for Node 3 and Node 4 of MN-PCH 102 have been reconfigured as spare HSIO controllers 214s for each of Node1 and Node2 for MN-PCH 102a.

Generally, reconfiguration of various components and interfaces on a multi-node PCH may be implemented via switching circuitry and control logic embedded on the PCH or a different chipset interconnect from the multi-node PCH to a CPU I/O interface. Moreover, the multi-node PCH chipset, with System Management Mode (SMM) support, can dynamically change the links while preserving system context and not requiring an Operating System (OS) reset. Additionally, support for this functionality does not require any OS changes and provides self-healing for any component in the MN-PCH required for standard OS survivability and support. Also, it provides resilience for other non-critical components in the MN-PCH, include both high-speed and legacy interfaces and controllers.

In one aspect for implementing self-healing, the MN-PCH provides error counters for each component that can be failedover with thresh-holding for errors. This provides a pre-notification for components that may fail and require a corresponding sparing/healing operation. The MN-PCH also provides sideband and in-band signaling for catastrophic uncorrectable errors. In many cases these classes of errors will be coupled with enhanced MCA (machine check architecture) features that have been recently introduced. This allows for a true firmware first modeling and will be utilized in this art when the "north side" of the DMI link in the Integrated IO (IIO) of an SoC processor (processor employing a System on a Chip architecture) has errors. Under these cases, the CPU complex fires the System Management Interrupt (SMI) instead of the MN-PCH as depicted in the flowcharts described below.

SMM is a special mode for handling system wide functions and is intended for use only be system firmware, and not by an OS or an application. When SMM is invoked through an SMI, the processor (e.g., Node CPU) saves its current state and switches to a separate operating environment contained in system management random access memory (SMRAM) or in a similar protected memory region. While in SMM, the processor executes SMI handler code to perform operations. When the SMI handler has completed its operations, it executes a resume instruction. This instruction causes the processor to reload its saved state, switch back to protected or real mode, and resume executing the interrupted application or OS tasks. In one embodiment, such SMI handler code may be stored in flash storage device 118, either as part of a Node's firmware image, or in a separate region (e.g., as part of shared node firmware 136).

Figure 3A:
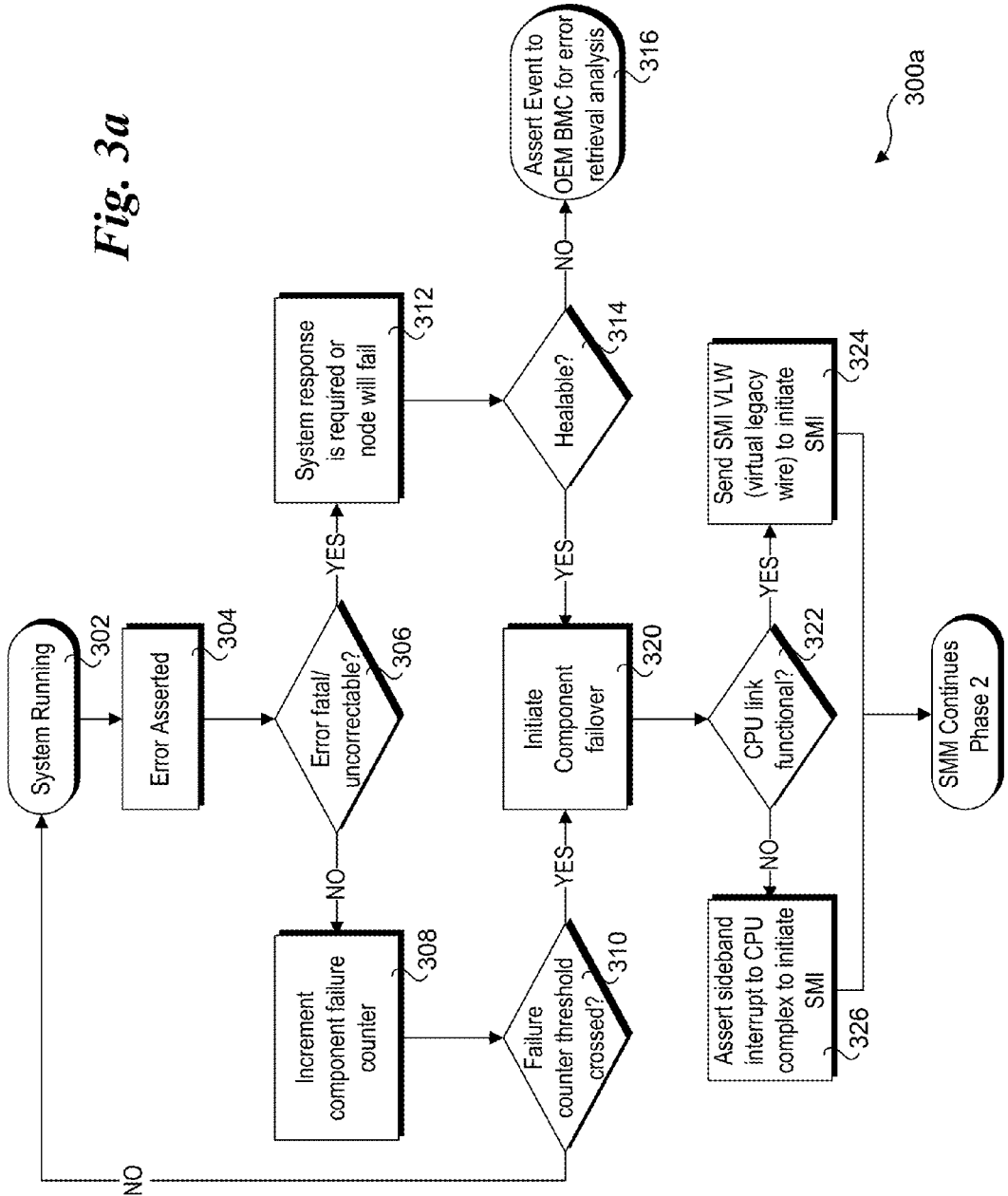
FIGS. 3a, 3b, and 3c collectively comprise a flowchart illustrating operations and logic for implementing automated node healing in response to detection of interface and component failures or failing conditions, according to one embodiment.
Figure 3B:
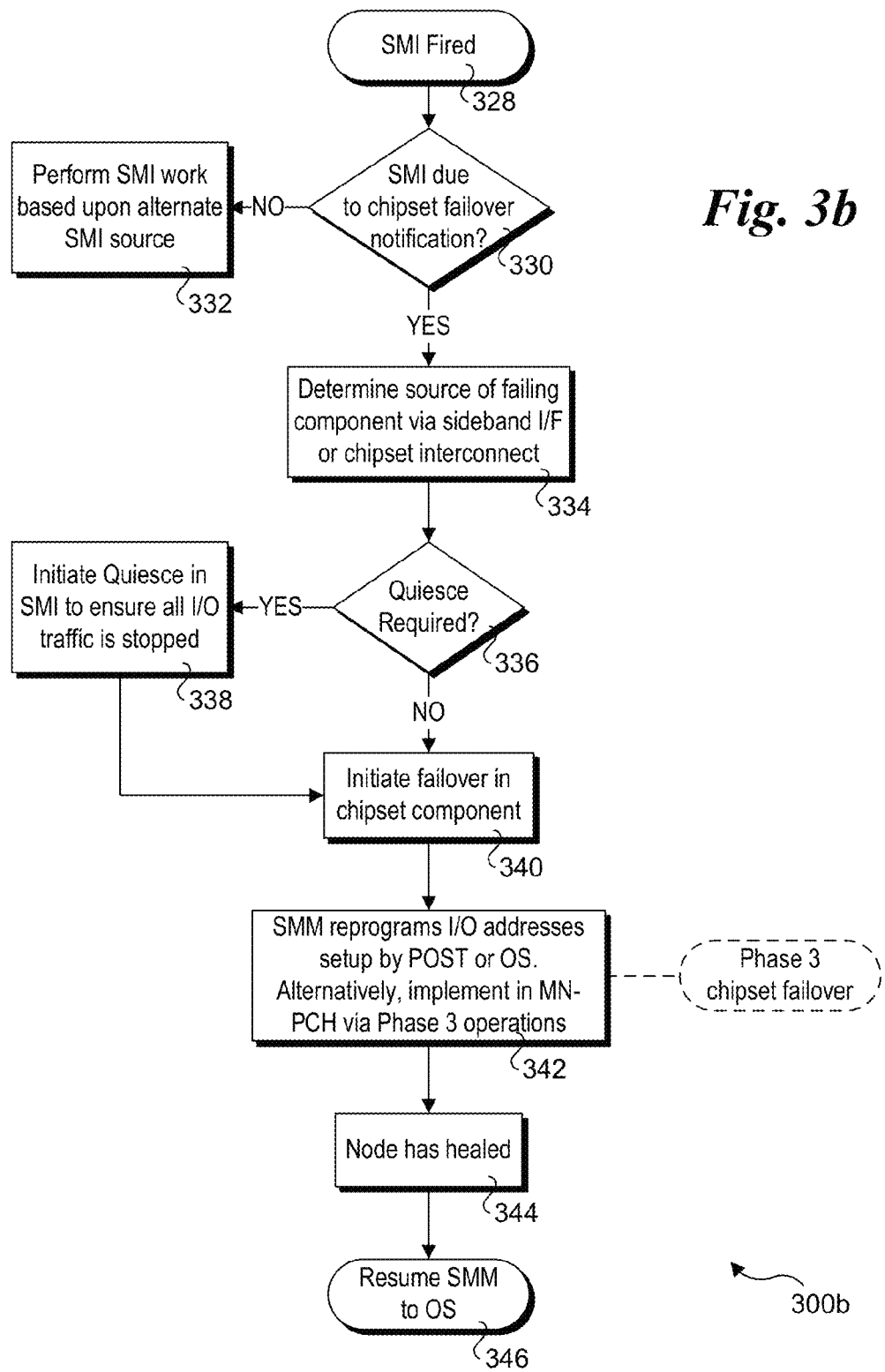
Figure 3C:
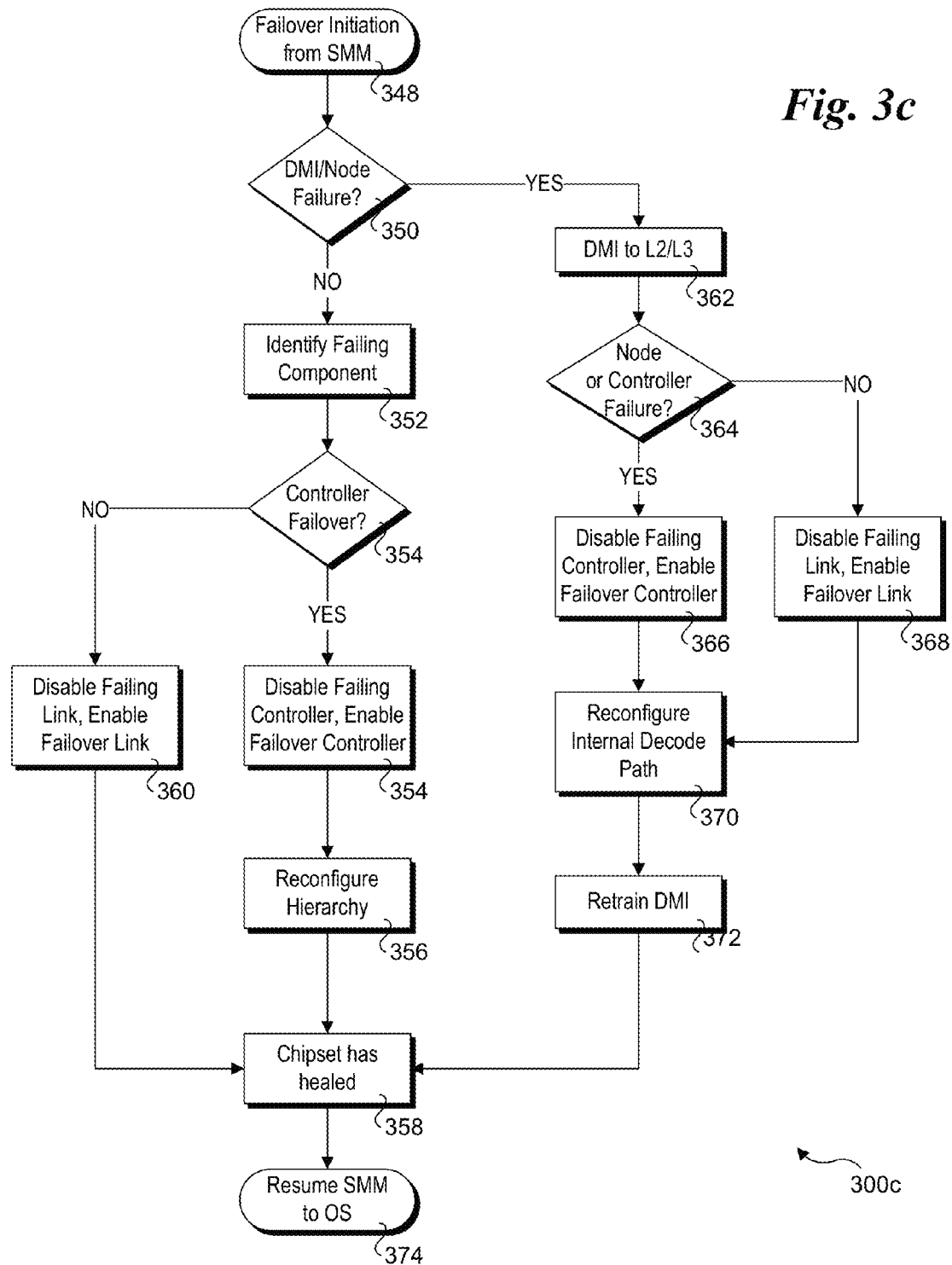

A process flow for implementing dynamic node healing, according to one embodiment, is illustrated in flowchart portions 300a, 300b, and 300c of FIGS. 3a, 3b, and 3c. The process flow begins in a start block 302 depicting the system running For example, processors on a multi-node platform that includes a MN-PCH chipset are operating under normal operating conditions without errors. In a block 304 an error is detected and asserted. There are various well-known mechanisms for asserting errors on platforms, such as via use of hard or soft interrupts, in-band or out-of-band messaging, management agents and the like, etc. Similarly, there are well-known mechanisms for detecting errors.

In response to the asserted error, a determination is made in a decision block 306 to whether the error is fatal or otherwise uncorrectable. If the answer is NO, the flow proceeds to a block 308 in which a component failure counter is incremented. For example, under various embodiments there may be component failure counters for individual components or for aggregations of components. More particularly, the component failure counters are implemented for components or aggregations of components that support failover. Such components generally may include interfaces, controllers, and components serving dedicated functions, wherein a spare or failover instance of the component is available as a replacement.

In conjunction with incrementing the component failure counter in block 308, a determination is made in a decision block 310 to whether the failure counter has crossed a threshold. For example, in one embodiment individual failure counter thresholds are set for corresponding components such that once an error for that component is detected a given number of times, an action will be taken. In this instance, when the threshold has been crossed, the answer to decision block 310 is YES, and the flow proceeds to a block 320 in which component failover is initiated. If the answer to decision block 310 is NO, the flow loops back to start block 302 to repeat the cycle of operations.

Returning to decision block 306, if the error is fatal or uncorrectable, the answer to decision block 306 is YES, and the flow proceeds to a block 312 indicating that a system response is required or the node will fail. A determination is then made in a decision block 314 to whether the errant component, interface, link, etc. is healable. If not, the flow proceeds to an end block 316 in which a corresponding error event is asserted to an OEM BMC for error retrieval analysis. If the answer to decision block 314 is YES, the flow proceeds to block 320 to initiate the component failover.

Upon initiating component failover in block 320, the flow proceeds to a decision block 322 in which a determination is made to whether an applicable CPU link is functional. For example, the CPU link may be an in-band link such as a DMI link or an out-of-band link. If the answer to decision block 322 is YES, the flow proceeds to a block 324 in which an SMI virtual legacy wire (VLW) is sent to the CPU for the node having the failed or failing component to initiate an SMI. If the answer to decision block 322 is NO, in one embodiment a sideband interrupt is asserted to interrupt the CPU complex to initiate the SMI. The flow then proceeds to the top of flowchart section 300*b* in FIG. 3*b*.

Flowchart section 300*b* begins with an SMI being fired in a start block 328. In response, a determination is made in a decision block 330 to whether the SMI is due to a chipset failover notification (e.g., a failover notification initiated by an MN-PCH). SMI may also be fired by other system components, termed herein as an alternative SMI source. In these cases, the answer to decision block 330 is NO, and appropriate SMI work is performed in a block 332 based on the SMI handler configured to be implemented for the alternate SMI source.

If the answer to decision block 330 is YES, the source of the failing component is determined via use of a sideband interface or chipset interconnect, as depicted in a block 334. In a decision block 336, a determination is made to whether a processor quiesce is required. Some processors support a quiesce mode under which interfaces and other components are quiesced (e.g., put into a sleep mode). Accordingly, if the answer to decision block 336 is YES, the flow proceeds to a block 338 in which the quiesce mode is initiated in SMI to ensure all I/O traffic is stopped.

If the answer to decision block 336 is NO or after the operations in block 338 have been completed (if the flow proceeds through this block), failover in the applicable chipset component is initiated in a block 340. This may include use of SMM to reprogram I/O addresses set up by POST during platform or node initialization or the OS during OS initialization or during OS run-time, as depicted in a block 344. Alternatively, I/O addresses are reprogrammed by self-configurable components in the MN-PCH. Further details of Phase 3 failover operations are illustrated in flowchart section 300*c* of FIG. 3, described below.

In some instances, node healing may be implemented entirely by the processor, which is part of the chipset. In this case, Phase 3 is not performed. Accordingly, after the operations of block 342 the node has healed, as shown in a block 344, and the remainder of the SMM operations are resumed to return control to the OS in an end block 346. As described above, the SMM issues a resume instruction that causes the processor to reload its saved state, switch back to protected or real mode, and resume executing the interrupted application or OS tasks.

Turning to flowchart section 300*c* of FIG. 3*c* corresponding to Phase 3, the process flow begins in a start block 348 depicting a failover initiation from SMM. In a decision block 350 a determination is made to whether the failure is a DMI or node failure. If the answer is NO, the flow proceeds to a block 352 in which the failing component is identified. In a decision block 354 a determination is made to whether the failover is a controller failover. If the answer is YES, the flow proceeds to a block 354 in which the failing controller is disabled and the failover controller (e.g., the spare controller) is enabled. The interconnect hierarchy is then reconfigured in a block 356, resulting in the chipset being healed, as depicted in a block 358. If the answer to decision block 354 is NO, the failover corresponds to a failing non-DMI link, which is disabled and an applicable failover link (and associated link interface) is enabled, as shown in a block 360.

Returning to decision block 350, if the answer to decision block 350 is YES, the flow proceeds to a block 362 in which the DMI link is put into a reduced power state, such as an L2 or L3 state, in one embodiment. In a block 364 a determination is made to whether the node or a node controller has failing or has failed. If the node or controller is detected as failing/failed, the answer to decision block 364 is YES, and the flow proceeds to a block 366 in which the failing/failed controller is disabled and the failover controller is enabled. If the answer to decision block 364 is NO, the failure is a DMI link failure and the flow proceeds to a block 368 in which the failing DMI link is disabled and a corresponding spare failover DMI link is enabled.

The flow next proceeds from either block 366 or 368 to a block 370 in which the internal decode path is reconfigured. Following this, the DMI link is returned to a normal power and operating state, which entails (among other things) a DMI link retraining operation as shown in a block 372. This results in the chipset being healed, as depicted in block 358. As before, in an end block 374 the SMM issues a resume and the processor operation is returned to the OS.

Figure 4:
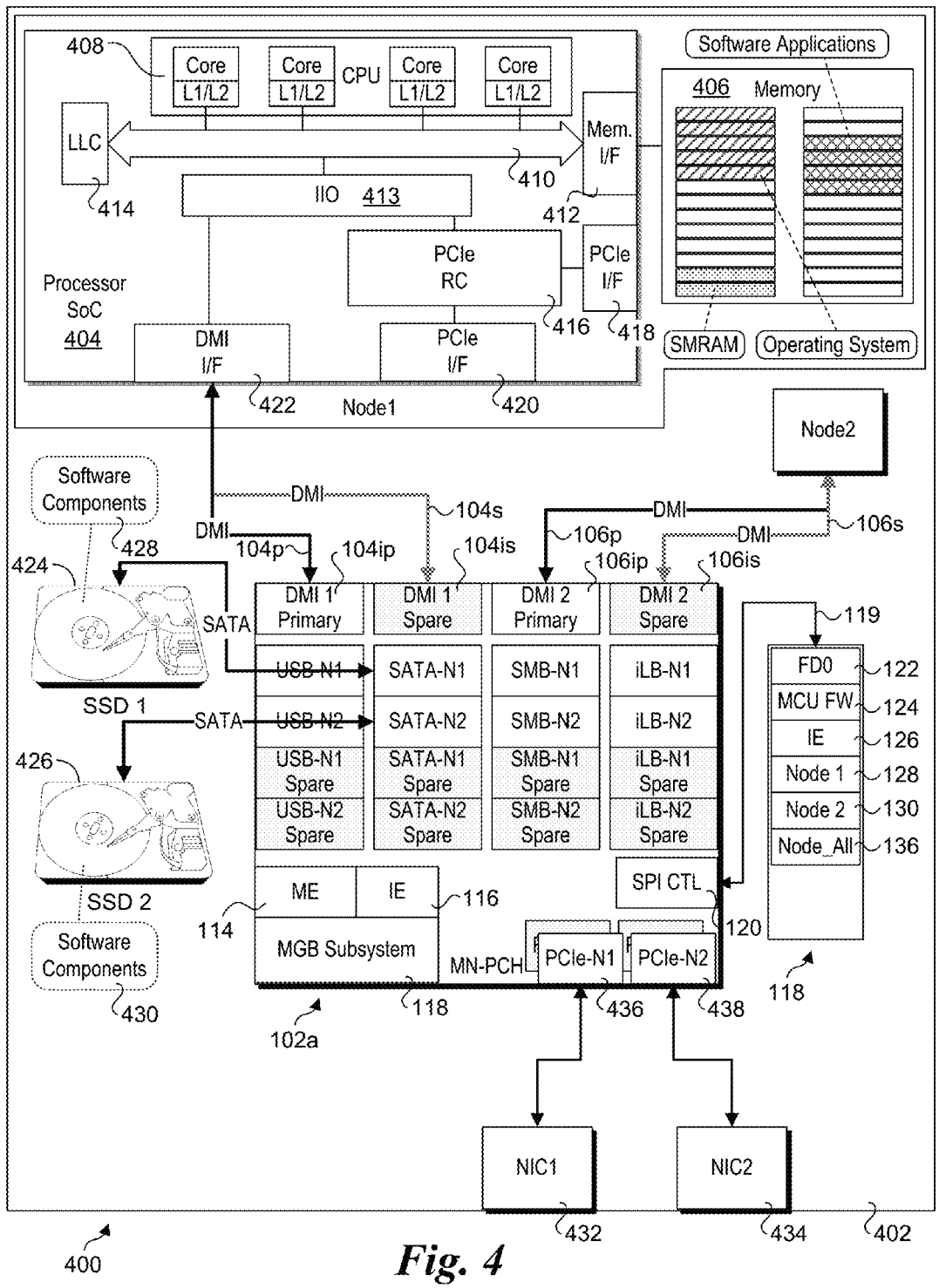
FIG. 4 is a schematic diagram illustrating system architecture 400 of a multi-node compute platform employing an MN-PCH configured to support dynamic node healing, according to one embodiment.
Figure 4A:
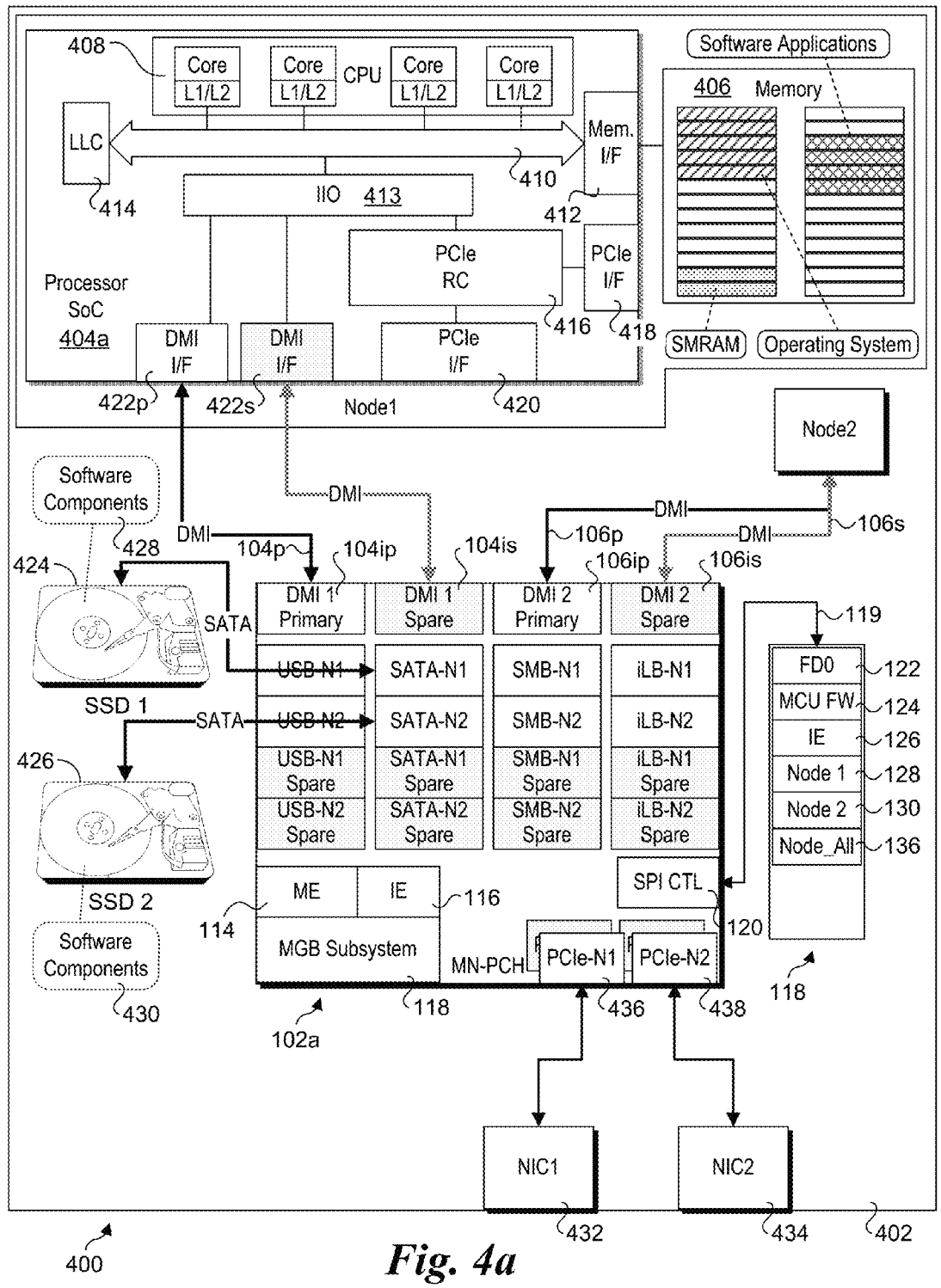
FIG. 4a is a schematic diagram illustrating an augmentation to system architecture 400 under which the processor supports dynamic healing of its DMI interface, according to one embodiment.

FIG. 4*a* shows a system architecture 400 of a multi-node compute platform employing MN-PCH 102*a*. The system includes a main board 402 on which various components are mounted, either directly (e.g., via reflow soldering or the like), or installed in a socket, connector, or similar type of mechanical interface mounted on main board 402. Main board 402 also includes wiring implemented through board layer traces and vias that are configured to interconnect the various components to enable electrical signals conveying data to be communicated between the components. For clarity, such wiring is no shown in FIG. 4*a*, but will be understood by those having skill in the art to be an inherent feature of a multi-node compute platform.

In the illustrated embodiment of FIG. 4a, system architecture 400 includes a pair of nodes labeled Node1 and Node2, as before. For illustrative purposes, Node2 is depicted as a simple block, while Node1 is shown in further detail; it will be understood that Node1 and Node2 have similar configurations to that depicted for Node1.

Each of Node1 and Node2 include a processor 404 and local system memory 406. In the illustrated embodiment, Processor 404 is implemented as an SoC including a CPU 408 including multiple cores, each associated with an L1 and L2 cache. The cores and L1/L2 caches are coupled to a coherent high-bandwidth interconnect 410 to which a memory interface 412 and an IIO block 413 are coupled. Under some SoC architectures, IIO may be connected to a separate interconnect that is coupled to interconnect 410 via a bridge or the like. A last layer cache (LLC) 414 is also depicted as being coupled to interconnect 410. The combination of memory 406, coherent interconnect 410 and the L1/L2 caches, and LLC 414 form a coherent memory domain.

IIO block 413 provides an interface between CPU 408 and various IO blocks and components on the SoC, which include a PCIe root complex 416 to which a pair of PCIe interfaces 418 and 420 are coupled, and a DMI interface 422. DMI interface 422 is connected to primary DMI interface 104ip and spare DMI interface 104is via wiring on main board 402 coupling applicable pins on processor 404 and MN-PCH 102a. In the illustrated embodiment the wiring is configured such that a single set of pins used by DMI interface 422 are coupled to respective sets of pins used by primary DMI interface 104ip and spare DMI interface 104is. In one embodiment, a DMI 2.0 link is implemented using a multi-lane link of up to 4 bidirectional lanes. Under an alternative configuration, a single set of wires is used for a DMI link between processor 404 and MN-PCH 102, and the wires are internally multiplexed and selectively coupled to primary DMI interface 104ip and spare DMI interface 104is.

Generally, software comprising an operating system and software applications may be accessed via one or more storage devices onboard the multi-node compute platform and/or downloaded over a network. In the illustrated embodiment, the multi-node compute platform includes a pair of solid state drives (SSDs) 424 and 426 on which sets of software components 428 and 430 are respectively stored. As shown, SSD 424 is coupled to Node1's primary SATA controller, while SSD 426 is coupled to Node2's primary SATA controller. Under another configuration, the software used by multiple nodes may be stored on a single storage device (such as an SSD) and accessed via a shared SATA interface. As another option, software components may be downloaded over a network accessed via network interface controllers (NICs) 432 and 434 coupled to primary PCIe interfaces 436 and 438 on MN-PCH 102a.

During platform initialization (or alternatively, initialization of a node) firmware for each of Node1, Node2, and MN-PCH 102a is read from flash storage device 118 and loaded into an applicable memory address space. For example, for Node1, all or a portion of Node1 firmware 128 may be loaded into a protected region of memory 406, while all or a portion of MCU firmware 124 is loaded into memory accessible to ME 114's microcontroller (not shown). Optionally, some firmware may be loaded into memory embedded on processor 404 (not shown). The firmware used to boot up a platform node is typically referred to a boot firmware and/or BIOS, which is used to initialize various system components in preparation to loading the operating system instance used by the node. In addition to this software, firmware used for SMM may be loaded into a protected portion of memory 406 depicted as "SMRAM," or may be loaded into embedded memory on processor 404. This portion of the boot process includes configuration of various controllers and interfaces, such as SATA controllers and NIC 432 (if the OS is to be booted over a network). Subsequently, software components comprising the operating system instance will be loaded into a protected region of memory 404. After the OS has booted, software components used for software applications may be loaded into a user space region of memory 406 allocated for applications by the OS.

FIG. 4a shows an alternative configuration under which a processor 404a includes both a primary DMI interface 422p and a spare DMI interface 422s that are respectively coupled to primary DMI interface 104ip and spare DMI interface 104is via separate sets of wires. Under this configuration, the DMI interface facilities on processor 404a may be healed by failover to spare DMI interface 422s in response to a failure or detected failing of primary DMI interface 422p.

Generally, the nodes in embodiments of multi-node platform architectures implementing dynamic node healing may be configured as discrete nodes with separate sets of resources (e.g., memory) that is accessible only to a given node, or NUMA (non-uniform memory access) architectures may be implemented, wherein a processor associated with a given node may be able to access memory local to another node. For example, in multi-socket platforms this may be enabled through socket-to-socket interconnects such as Quickpath Interconnect™ (QPI) socket-to-socket interconnects between sockets.

The dynamic node healing capabilities provided by the embodiments herein further enhance inherent advantages of multi-node PCHs. By providing redundancies for selected interfaces and components in combination with automated failure detection and failover, the reliability and resilience of the platform is significantly enhanced. Moreover, since failovers are performed in a manner that is transparent to the operating systems hosted by the multi-node platform processors, MN-PCH failures may be addressed without having to take the affected node or the entire platform offline.

Further aspects of the subject matter described herein are set out in the following numbered clauses:

1. A multi-node platform controller hub (MN-PCH), comprising:

a plurality of node interfaces, configured to facilitate communication with plurality of nodes on a compute platform;

an internal interconnect;

an interface, coupled to the internal interconnect and configured to be coupled to a storage device on the compute platform containing firmware for each of the plurality of nodes and firmware used by embedded components in the MN-PCH;

a plurality of sets of high-speed Input-Output (IO) controllers, coupled to the internal interconnect, each configurable to be dedicated for use by a respective node;

a plurality of sets of legacy IO facilities coupled to the internal interconnect, each of the sets of legacy IO facilities configurable to be dedicated for used by a respective node; and a manageability engine, shared across the plurality of nodes.

2. The MN-PCH of clause 1, wherein the plurality of node interfaces and the plurality of sets of high-speed IO controllers are reconfigurable such that they can be configured as a primary interface or controller and a spare interface or controller for a node, and wherein the plurality of sets of legacy IO facilities are reconfigurable such that they can be configured as a primary set of legacy IO facilities and a spare set of legacy IO facilities for a node.

3. The MN-PCH of clause 2, wherein the MN-PCH is enabled to perform dynamic node healing via circuitry and logic configured to:

detect that a primary interface or component is failing or has failed;

automatically perform a failover under which the primary interface or component is replaced with a corresponding spare interface or component; and resume operation of the MN-PCH using the spare interface or component.

4. The MN-PCH of clause 3, wherein the dynamic node healing is performed in a manner that is transparent to operating systems running on each of the plurality of nodes.

5. The MN-PCH of clause 3 or 4, wherein the dynamic node healing employs a processor System Management Mode (SMM) under which a System Management Interrupt (SMI) is fired in response to detection of a failing or failed interface or component, causing a processor using the failing or failed interface or component to enter SMM, wherein failover operations for the failing or failed interface or component are performed while the processor is in SMM, and after the failover operations have been completed the processor is returned from SMM to a normal operating mode.

6. The MN-PCH of any of clauses 3-5, wherein the plurality of node interfaces comprise Direct Media Interface (DMI) interfaces, and the MN-PCH is configured to perform dynamic node healing of a DMI interface that is detected to be failing or has failed.

7. The MN-PCH of any of clauses 3-6, wherein the MN-PCH is configured to:

detect an error for a component;

determine if the error is fatal or uncorrectable;

if the error is determined to not be fatal or uncorrectable, increment a component failure counter for the component;

determine if a failure count for the component has crossed a threshold; and in response determining the failure count for the component has crossed the threshold, initiate a component failover.

8. The MN-PCH of any of clauses 3-7, wherein the MN-PCH is configured to:

detect an error for a component;

determine if the error is fatal or uncorrectable;

if the error is determined to be fatal or uncorrectable, determine whether the node employing the component with the error is healable; and if the node is healable, initiate a component failover.

9. The MN-PCH any of clauses 2-8, wherein the MN-PCH may be selectively configured to implement PCH facilities for:

N nodes, each node including at least one central processing unit (CPU) or CPU complex; and N/2 nodes with redundancy, wherein PCH facilities for the N/2 nodes that are not used are reconfigured as spare PCH facilities for the N/2 nodes coupled to the MN-PCH.

10. The MN-PCH of clause 9, wherein the MN-PCH may further be selectively configured to implement PCH facilities for 2N nodes.

11. The MN-PCH of any of the proceeding clauses, wherein each set of high-speed IO controllers includes at least one Peripheral Component Interconnect Express (PCIe) controller, at least one Universal Serial Bus (USB) controller, and at least Serial Advanced Technology Attachment (SATA) controller.

12. The MN-PCH of any of the proceeding clauses, wherein the internal interconnect includes a high-bandwidth root fabric and a low-bandwidth sub-fabric, wherein the high-speed IO controllers are coupled to the high-bandwidth root fabric and the sets of legacy IO facilities are connected to the low-bandwidth sub-fabric.

13. The MN-PCH of any of the proceeding clauses, further comprising an innovation engine coupled to the internal interconnect and shared across nodes, wherein the innovation engine is configured to enable Original Equipment Manufacturers (OEMs) to customize manageability facilities.

14. A method implemented on a multi-node compute platform including a plurality of nodes coupled to a multi-node platform controller hub (MN-PCH), the method comprising:

configuring, for each of the plurality of nodes, a first plurality of components and interfaces on the MN-PCH to be implemented as primary components and interfaces for dedicated for use by that node;

configuring a second plurality of components and interfaces on the MN-PCH to be used as spare components and interfaces;

detecting that a primary component or interface is failing or has failed; and automatically performing a failover operation to reconfigure the MN-PCH to replace the primary component or interface with a corresponding spare component or interface.

15. The method of clause 14, wherein the MN-PCH includes a plurality of Direct Media Interface (DMI) interfaces, the method further comprising:

configuring the plurality of DMI interfaces as primary DMI interfaces and spare DMI interfaces;

communicatively coupling each of the plurality of nodes to the MN-PCH via a primary DMI link coupled at the MN-PCH at a respective primary DMI interface;

detecting that a primary DMI interface is failing or has failed;

putting the DMI link coupled to the DMI interface that is detected to be failing or has failed into a reduced power state;

performing a DMI link failover under which the MN-PCH is reconfigured to replace the failing or failed DMI interface with a spare DMI interface that is implemented as a failover DMI link;

retraining the failover DMI link; and resuming communication between the node and the MN-PCH using the failover DMI link.

16. The method of clause 14 or 15, wherein the failover operation is performed in a manner transparent to operating systems hosted by the plurality of nodes.

17. The method of clause 16, further comprising:

initiating a component failover for a component in the MN-PCH configured to be used by a corresponding node;

firing a System Management Interrupt (SMI) to cause a processor associated with the node and operating in a normal operating mode to enter a System Management Mode (SMM);

performing component failover operations on the MN-PCH to replace a failing or failed component with a corresponding failover component; and issuing an SMM resume instruction to the processor to cause the processor to exit SMM and return to the normal operating mode.

18. The method of clause 17, further comprising causing the node to enter a quiesce state prior to performing the component failover operations.

19. The method of any of clauses 14-18, further comprising:
detecting an error for a component;
determining if the error is fatal or uncorrectable;
if the error is determined to not be fatal or uncorrectable, incrementing a component failure counter for the component;
determining if a failure count for the component has crossed a threshold; and
in response determining the failure count for the component has crossed the threshold, initiating a component failover.

20. The method of any of clauses 14-19, further comprising:
detecting an error for a component;
determining if the error is fatal or uncorrectable;
if the error is determined to be fatal or uncorrectable, determining whether the node employing the component with the error is healable; and
if the node is healable, initiating a component failover.

21. The method of any of clauses 14-20, wherein the first plurality of components and interfaces includes a set of high-speed input-output (IO) interfaces and controllers for each node and a set of legacy IO facilities for each node:

22. The method of any of clauses 14-21, further comprising:
detecting, for each of a portion of the interfaces on the MN-PCH whether the interface is coupled to a node; and
if the interface is coupled to a node, automatically configuring the interface as a primary interface,
otherwise, automatically configuring the interface as a spare interface.

23. A system, comprising:
a main board, having a plurality of components mounted thereto and having wiring connecting signals from the plurality of components;
a plurality of processor nodes, each including a processor;
system memory, including respective portions of memory coupled to each processor nodes;
a first storage device;
a multi-node platform controller hub (MN-PCH) including,
a plurality of node communication interfaces, each configurable to be communicatively coupled to a processor node;
an internal interconnect, including a high-bandwidth root fabric and a low-bandwidth sub-fabric;
an interface, coupled to the internal interconnect and configured to be coupled via a link to a firmware storage device on main board containing firmware for each of the processor nodes and firmware used by embedded components in the MN-PCH;
a plurality of sets of high-speed Input-Output (IO) controllers, coupled to the high-speed root fabric, each configurable to be dedicated for use by a respective node, each set of high-speed controllers including at least one Peripheral Component Interconnect Express (PCIe) controller, at least one Universal Serial Bus (USB) controller, and at least Serial Advanced Technology Attachment (SATA) controller including a SATA controller coupled to the first storage device; and
a plurality of sets of legacy IO facilities coupled to the low-bandwidth sub-fabric, each of the sets of legacy IO facilities configurable to be dedicated for used by a respective processor node.

24. The system of clause 23, wherein the plurality of node communication interfaces and the plurality of sets of high-speed IO controllers are reconfigurable such that they can be configured as a primary interface or controller and a spare interface or controller for a processor node, and wherein the plurality of sets of legacy IO facilities are reconfigurable such that they can be configured as a primary set of legacy IO facilities and a spare set of legacy IO facilities for a processor node.

25. The system of clause 24, wherein the MN-PCH is enabled to perform dynamic node healing via circuitry and logic configured to:
detect that a primary interface or component is failing or has failed;
automatically perform a failover under which the primary interface or component is replaced with a corresponding spare interface or component; and
resume operation of the MN-PCH using the spare interface or component.

26. The system of clause 25, wherein the first storage device includes an operating system or the system is configured to load an operating system via a network, and wherein the MN-PCH is configured to perform dynamic node healing in a manner that is transparent to operating systems running on each of the processor nodes when the system is operating.

27. The system of clause 25 or 26, wherein the dynamic node healing employs a processor System Management Mode (SMM) under which a System Management Interrupt (SMI) is fired in response to detection of a failing or failed interface or component, causing a processor of a processor node using the failing or failed interface or component to enter SMM, wherein failover operations for the failing or failed interface or component are performed while the processor is in SMM, and after the failover operations have been completed the processor is returned from SMM to a normal operating mode.

28. The system of any of clauses 25-27, wherein the plurality of node communication interfaces comprise Direct Media Interface (DMI) interfaces, and the MN-PCH is configured to perform dynamic node healing of a DMI interface that is detected to be failing or has failed.

29. The system of any of clauses 23-28, wherein the plurality of node communication interfaces comprise Direct Media Interface (DMI) interfaces, and at least one processor includes a primary DMI interface and a spare DMI interface and is configured to:
detect a failure of the primary DMI interface; and
perform an automatic failover to the spare DMI interface.

30. A multi-node platform controller hub (MN-PCH), configured to be implemented on a multi-node compute platform including a plurality of nodes, comprising:
a plurality of node interfaces, each configured to facilitate communication with a respective node;
an internal interconnect;
a plurality of sets of high-speed Input-Output (IO) controllers, coupled to the internal interconnect, wherein a first portion of the high-speed controllers are configured to be implemented as a primary high-speed controllers for respective nodes, and a second portion of high-speed controllers are configured to be implemented as spare high-speed controllers by the respective nodes;

a plurality of sets of legacy IO facilities coupled to the internal interconnect, wherein each set of legacy IO facilities includes primary legacy IO facilities and spare legacy IO facilities configured for used by a respective node;

a manageability engine, shared across the plurality of nodes; and an interface, coupled to the internal interconnect and configured to be coupled to a storage device on the compute platform containing firmware configured for use by the plurality of nodes and firmware configured for use by embedded components in the MN-PCH including the manageability engine.

31. The MN-PCH of clause 30, wherein the MN-PCH is enabled to perform dynamic node healing via circuitry and logic configured to:

detect that a primary interface or component is failing or has failed;

automatically perform a failover under which the primary interface or component is replaced with a corresponding spare interface or component; and resume operation of the MN-PCH using the spare interface or component.

32. The MN-PCH of clause 32, wherein the dynamic node healing is performed in a manner that is transparent to operating systems running on each of the plurality of nodes.

33. The MN-PCH of clause 31 or 32, wherein the dynamic node healing employs a processor System Management Mode (SMM) under which a System Management Interrupt (SMI) is fired in response to detection of a failing or failed interface or component, causing a processor using the failing or failed interface or component to enter SMM, wherein failover operations for the failing or failed interface or component are performed while the processor is in SMM, and after the failover operations have been completed the processor is returned from SMM to a normal operating mode.

34. The MN-PCH of any of clauses 31-33, wherein the plurality of node interfaces comprise Direct Media Interface (DMI) interfaces, and the MN-PCH is configured to perform dynamic node healing of a DMI interface that is detected to be failing or has failed.

35. The MN-PCH of any of clauses 31-34, wherein the MN-PCH is configured to:

detect an error for a component;

determine if the error is fatal or uncorrectable;

if the error is determined to not be fatal or uncorrectable, increment a component failure counter for the component;

determine if a failure count for the component has crossed a threshold; and in response determining the failure count for the component has crossed the threshold, initiate a component failover.

36. The MN-PCH of any of clauses 31-35, wherein the MN-PCH is configured to:

detect an error for a component;

determine if the error is fatal or uncorrectable;

if the error is determined to be fatal or uncorrectable, determine whether the node employing the component with the error is healable; and if the node is healable, initiate a component failover.

37. The MN-PCH of any of clauses 30-36, wherein each set of high-speed IO controllers includes at least one Peripheral Component Interconnect Express (PCIe) controller, at least one Universal Serial Bus (USB) controller, and at least Serial Advanced Technology Attachment (SATA) controller.

38. The MN-PCH of any of clauses 30-37, wherein the internal interconnect includes a high-bandwidth root fabric and a low-bandwidth sub-fabric, wherein the high-speed IO controllers are coupled to the high-bandwidth root fabric and the sets of legacy IO facilities are connected to the low-bandwidth sub-fabric.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on a node processor or software and/or firmware executed by an embedded processor or the like. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

Italicized letters, such as 'M' and 'N' in the foregoing detailed description and the claims are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A multi-node platform controller hub (MN-PCH), comprising:
    a plurality of node interfaces, configured to facilitate communication with a plurality of nodes on a compute platform;
    an internal interconnect;
    an interface, coupled to the internal interconnect and configured to be coupled to a storage device on the compute platform containing firmware for each of the plurality of nodes and firmware used by embedded components in the MN-PCH;
    a plurality of sets of high-speed Input-Output (IO) controllers, coupled to the internal interconnect, each configurable to be dedicated for use by a respective node;
    a plurality of sets of legacy IO facilities coupled to the internal interconnect, each of the sets of legacy IO facilities configurable to be dedicated for used by a respective node; and
    a manageability engine, shared across the plurality of nodes.

2. The MN-PCH of claim 1, wherein the plurality of node interfaces and the plurality of sets of high-speed IO controllers are reconfigurable such that they can be configured as a primary interface or controller and a spare interface or controller for a node, and wherein the plurality of sets of legacy IO facilities are reconfigurable such that they can be configured as a primary set of legacy IO facilities and a spare set of legacy IO facilities for a node.

3. The MN-PCH of claim 2, wherein the MN-PCH is enabled to perform dynamic node healing via circuitry and logic configured to:
    detect that a primary interface or component is failing or has failed;
    automatically perform a failover under which the primary interface or component is replaced with a corresponding spare interface or component; and
    resume operation of the MN-PCH using the spare interface or component.

4. The MN-PCH of claim 3, wherein the dynamic node healing is performed in a manner that is transparent to operating systems running on each of the plurality of nodes.

5. The MN-PCH of claim 3, wherein the dynamic node healing employs a processor System Management Mode (SMM) under which a System Management Interrupt (SMI) is fired in response to detection of a failing or failed interface or component, causing a processor using the failing or failed interface or component to enter SMM, wherein failover operations for the failing or failed interface or component are performed while the processor is in SMM, and after the failover operations have been completed the processor is returned from SMM to a normal operating mode.

6. The MN-PCH of claim 3, wherein the plurality of node interfaces comprise Direct Media Interface (DMI) interfaces, and the MN-PCH is configured to perform dynamic node healing of a DMI interface that is detected to be failing or has failed.

7. The MN-PCH of claim 3, wherein the MN-PCH is configured to:
detect an error for a component;
determine if the error is fatal or uncorrectable;
if the error is determined to not be fatal or uncorrectable, increment a component failure counter for the component;
determine if a failure count for the component has crossed a threshold; and
in response determining the failure count for the component has crossed the threshold, initiate a component failover.

8. The MN-PCH of claim 3, wherein the MN-PCH is configured to:
detect an error for a component of the MN-PCH;
determine if the error is fatal or uncorrectable;
if the error is determined to be fatal or uncorrectable, determine whether the node employing the component with the error is healable; and
if the node is healable, initiate a component failover.

9. The MN-PCH of claim 2, wherein the MN-PCH may be selectively configured to implement PCH facilities for:
N nodes, each node including at least one central processing unit (CPU) or CPU complex; and
N/2 nodes with redundancy, wherein PCH facilities for the N/2 nodes that are not used are reconfigured as spare PCH facilities for the N/2 nodes coupled to the MN-PCH.

10. The MN-PCH of claim 9, wherein the MN-PCH may further be selectively configured to implement PCH facilities for 2N nodes.

11. A method implemented on a multi-node compute platform including a plurality of nodes coupled to a multi-node platform controller hub (MN-PCH), the method comprising:
configuring, for each of the plurality of nodes, a first plurality of components and interfaces on the MN-PCH to be implemented as primary components and interfaces dedicated for use by that node;
configuring a second plurality of components and interfaces on the MN-PCH to be used as spare components and interfaces;
detecting that a primary component or interface is failing or has failed; and
automatically performing a failover operation to reconfigure the MN-PCH to replace the primary component or interface with a corresponding spare component or interface.

12. The method of claim 11, wherein the MN-PCH includes a plurality of Direct Media Interface (DMI) interfaces, the method further comprising:
configuring the plurality of DMI interfaces as primary DMI interfaces and spare DMI interfaces;
communicatively coupling each of the plurality of nodes to the MN-PCH via a primary DMI link coupled at the MN-PCH at a respective primary DMI interface;
detecting that a primary DMI interface is failing or has failed;
putting the DMI link coupled to the DMI interface that is detected to be failing or has failed into a reduced power state;
performing a DMI link failover under which the MN-PCH is reconfigured to replace the failing or failed DMI interface with a spare DMI interface that is implemented as a failover DMI link;
retraining the failover DMI link; and
resuming communication between the node and the MN-PCH using the failover DMI link.

13. The method of claim 11, wherein the failover operation is performed in a manner transparent to operating systems hosted by the plurality of nodes.

14. The method of claim 13, further comprising:
initiating a component failover for a component in the MN-PCH configured to be used by a corresponding node;
firing a System Management Interrupt (SMI) to cause a processor associated with the node and operating in a normal operating mode to enter a System Management Mode (SMM);
performing component failover operations on the MN-PCH to replace a failing or failed component with a corresponding failover component; and
issuing an SMM resume instruction to the processor to cause the processor to exit SMM and return to the normal operating mode.

15. The method of claim 14, further comprising causing the node to enter a quiesce state prior to performing the component failover operations.

16. The method of claim 11, further comprising:
detecting an error for a component;
determining if the error is fatal or uncorrectable;
if the error is determined to not be fatal or uncorrectable, incrementing a component failure counter for the component;
determining if a failure count for the component has crossed a threshold; and
in response determining the failure count for the component has crossed the threshold, initiating a component failover.

17. The method of claim 11, further comprising:
detecting an error for a component;
determining if the error is fatal or uncorrectable;
if the error is determined to be fatal or uncorrectable, determining whether the node employing the component with the error is healable; and
if the node is healable, initiating a component failover.

18. The method of claim 11, wherein the first plurality of components and interfaces includes a set of high-speed input-output (IO) interfaces and controllers for each node and a set of legacy IO facilities for each node.

19. The method of claim 11, further comprising:
detecting, for each of a portion of the interfaces on the MN-PCH whether the interface is coupled to a node; and
if the interface is coupled to a node, automatically configuring the interface as a primary interface,
otherwise, automatically configuring the interface as a spare interface.

20. A system, comprising:
a main board, having a plurality of components mounted thereto and having wiring connecting signals from the plurality of components;
a plurality of processor nodes, each including a processor;
system memory, including respective portions of memory coupled to each processor nodes;
a first storage device;
a multi-node platform controller hub (MN-PCH) including, a plurality of node communication interfaces, each configurable to be communicatively coupled to a processor node;

an internal interconnect, including a high-bandwidth root fabric and a low-bandwidth sub-fabric;

an interface, coupled to the internal interconnect and configured to be coupled via a link to a firmware storage device on main board containing firmware for each of the processor nodes and firmware used by embedded components in the MN-PCH;

a plurality of sets of high-speed Input-Output (IO) controllers, coupled to the high-speed root fabric, each configurable to be dedicated for use by a respective node, each set of high-speed IO controllers including at least one Peripheral Component Interconnect Express (PCIe) controller, at least one Universal Serial Bus (USB) controller, and at least Serial Advanced Technology Attachment (SATA) controller including a SATA controller coupled to the first storage device; and a plurality of sets of legacy IO facilities coupled to the low-bandwidth sub-fabric, each of the sets of legacy IO facilities configurable to be dedicated for used by a respective processor node.

21. The system of claim 20, wherein the plurality of node communication interfaces and the plurality of sets of high-speed IO controllers are reconfigurable such that they can be configured as a primary interface or controller and a spare interface or controller for a processor node, and wherein the plurality of sets of legacy IO facilities are reconfigurable such that they can be configured as a primary set of legacy IO facilities and a spare set of legacy IO facilities for a processor node.

22. The system of claim 21, wherein the MN-PCH is enabled to perform dynamic node healing via circuitry and logic configured to:
   detect that a primary interface or component is failing or has failed;
   automatically perform a failover under which the primary interface or component is replaced with a corresponding spare interface or component; and
   resume operation of the MN-PCH using the spare interface or component.

23. The system of claim 22, wherein the first storage device includes an operating system or the system is configured to load an operating system via a network, and wherein the MN-PCH is configured to perform dynamic node healing in a manner that is transparent to operating systems running on each of the processor nodes when the system is operating.

24. The system of claim 22, wherein the dynamic node healing employs a processor System Management Mode (SMM) under which a System Management Interrupt (SMI) is fired in response to detection of a failing or failed interface or component, causing a processor of a processor node using the failing or failed interface or component to enter SMM, wherein failover operations for the failing or failed interface or component are performed while the processor is in SMM, and after the failover operations have been completed the processor is returned from SMM to a normal operating mode.

25. The system of claim 22, wherein the plurality of node communication interfaces comprise Direct Media Interface (DMI) interfaces, and the MN-PCH is configured to perform dynamic node healing of a DMI interface that is detected to be failing or has failed.

* * * * *